Figure 1:
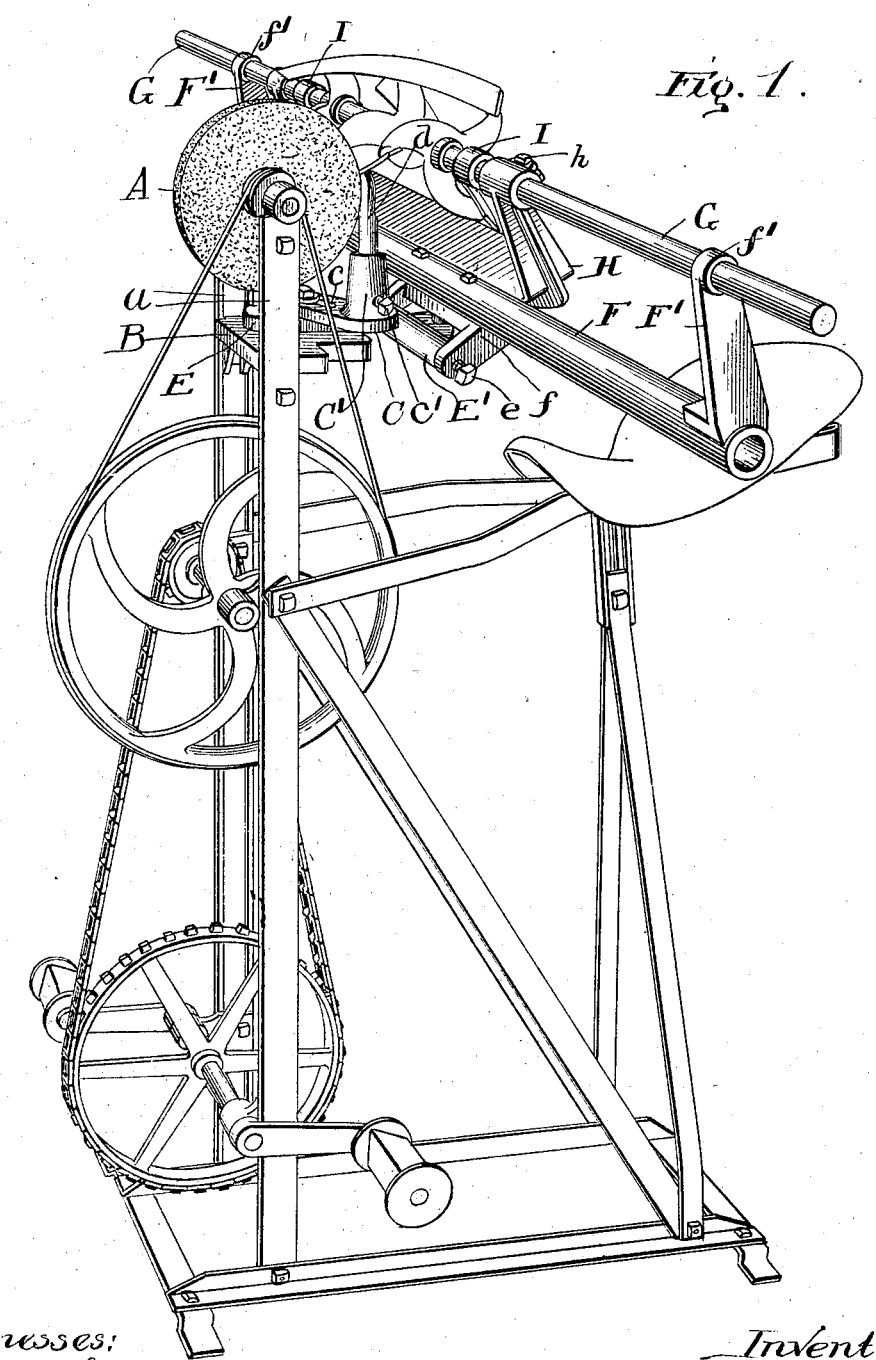

No. 709,178. Patented Sept. 16, 1902.
S. C. SCHOFIELD.
TOOL HOLDER AND GUIDE FOR GRINDSTONES.
(Application filed Jan. 30, 1902.)
(No Model.) 2 Sheets—Sheet 1.

Witnesses:
Chas. O. Shervey
M. B. Bliss.

Inventor:
Silas C. Schofield
by H. P. Bitner
Atty.

No. 709,178. Patented Sept. 16, 1902.
S. C. SCHOFIELD.
TOOL HOLDER AND GUIDE FOR GRINDSTONES.
(Application filed Jan. 30, 1902.)
(No Model.) 2 Sheets—Sheet 2.
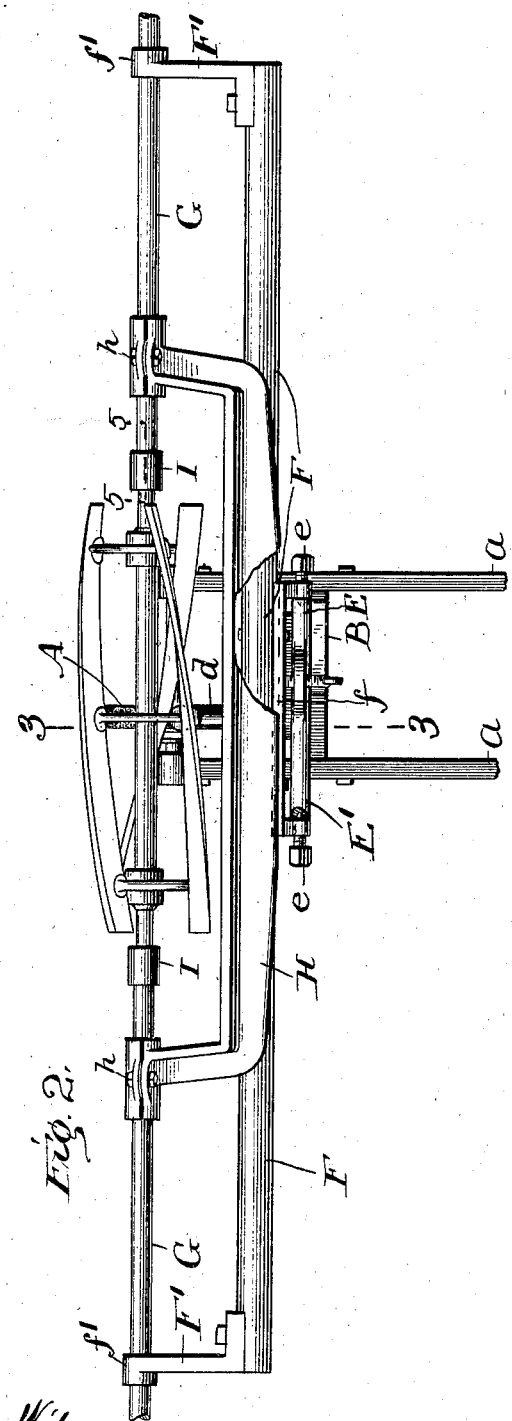
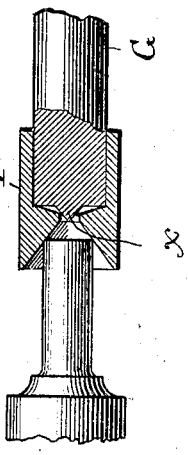
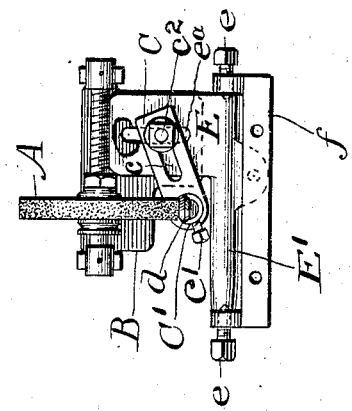
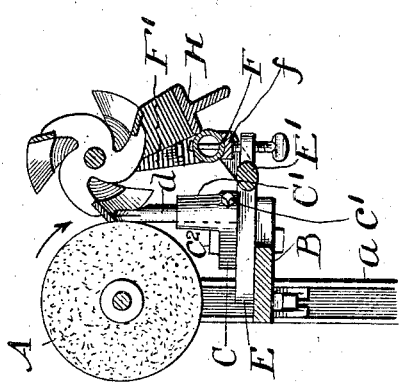
Witnesses:
Chas. O. Shurvey
M. B. Bliss
Inventor:
Silas C. Schofield
by H. Bitner,
Atty

UNITED STATES PATENT OFFICE.

SILAS C. SCHOFIELD, OF FREEPORT, ILLINOIS.

TOOL HOLDER AND GUIDE FOR GRINDSTONES.

SPECIFICATION forming part of Letters Patent No. 709,178, dated September 16, 1902.

Application filed January 30, 1902. Serial No. 91,834. (No model.)

*To all whom it may concern:*

Be it known that I, SILAS C. SCHOFIELD, a citizen of the United States of America, residing at Freeport, in the county of Stephenson and State of Illinois, have invented certain new and useful Improvements in Tool Holders and Guides for Grindstones, of which the following is a specification.

My invention relates to certain new and useful improvements in tool holders and guides for grindstones, the particular object of my invention being to produce a guide and toolholder which will take a cutter of the ordinary three or four spiral-bladed lawn-mower and serve as a proper holder and tool-guide for the same while it is being ground.

To this end my invention consists in certain novel features of construction, which are fully shown in the drawings, and described in the specification.

In the drawings, Figure 1 is a perspective of a grindstone of the ordinary type having my tool guide and holder with a lawn-mower blade in the position for grinding. Fig. 2 is a front elevation of the tool holder and guide with a slight portion of the frame of the machine. Fig. 3 is a section in the line 3 3 of Fig. 2. Fig. 4 is a top view of the grindstone and the guide proper as distinguished from the tool-holder; and Fig. 5 is a detail section in the line 5 5 of Fig. 2, showing the construction of the cutter-centering mechanism, the cutter-shaft being shown in elevation in said figure.

In the drawings, A is a suitably-driven emery-wheel journaled in the extremities of the two arms $a$, as shown in Fig. 1, and B is the base of the machine immediately below the grindstone, suitably perforated, as shown in Fig. 4. Above the base B is a plate C, perforated longitudinally of its length by the slot $c$. The plate C is adjustably clamped in place by means of the bolt $c^2$ and has on its extremity farthest removed from the slot $c$ the boss C', provided with a clamping-bolt $c'$. Within the boss C' runs an upright arm $d$, vertically adjustable and held in place by the bolt $c'$. This arm is shown as having a rounded beveled top, as seen in Figs. 3 and 4, which forms the guide proper against which the blade rests, as distinguished from the cutterholder. Upon the base B and between it and the plate C is a second plate E, slotted, as shown at $e^a$ in Fig. 4, and held in place also by the bolt $c^2$. The slot runs so as to make the plate horizontally movable to and from the axis of the grindstone. The plate $e$ is provided with an arm E', Fig. 4, containing at its ends two conical depressions. Upon this arm is pivotally swung the cutter-holder by means of pointed screws $e$ entering the conical depressions of the arm E' of the plate E. The cutter-holder consists of a bar F, bolted to the framework $f$, which is swung upon the plate E, as above described. Upon the ends of this bar are two upwardly-projecting arms F', having at their upper extremities the two journal-boxes $f'$, Figs. 1 and 2. Through each of the journals $f'$ runs a shaft G, and these two shafts are connected by the yoke H, the three parts together forming the solid piece. The whole is both rotatably and longitudinally movable with respect to the arms F'. The inner ends of the shafts can be longitudinally moved with respect to the yoke and they can be clamped in place by the set-screw $h$ of the yoke, thereby varying the distance between them. The said inner ends have conical projections (see Fig. 5) to fit such cutter-shafts as happen to be centered, and they are also provided with removable caps I, conically apertured and adapted to center cutter-shafts which have not been centered in a lathe. The operation of the device is substantially as follows: The cutter is placed between the inner ends of the shafts and centered either by the conical projection or by the removable cap I with respect to the shafts. The shafts are then pushed tightly against it and secured by tightening the screw $h$. The tool-holder is then swung so as to permit the cutter to take the position shown in Fig. 3, where the blade is in contact with the guide proper. The grindstone is then revolved in the direction shown by the arrow in Fig. 3, which tends to hold the blade firmly against the guide, and it is moved longitudinally by means of the yoke H, the shafts G sliding in the journals $f'$ to permit the movement. It will be seen that this holder furnishes a very convenient and simple device for holding a lawn-mower cutter, and it certainly greatly simplifies the grinding of the same, to say nothing of the fact that it produces a much better job than can be done by hand, as a perfectly even edge is obtained without any special skill on the part of the operator.

I realize that considerable changes can be made in the details of this construction, and I do not intend to limit myself to the specific form herein set forth.

I claim as new and desire to secure by Letters Patent—

1. The combination with a suitable grindstone and frame, of a frame pivotally connected to the supporting-frame of said grindstone, a suitable longitudinally-movable yoked shaft journaled in said frame, suitable means for supporting a lawn-mower cutter within said yoke in line with said shaft, and a suitable tool-guide adapted to fix the position of the blades of said cutter with reference to said grindstone; substantially as described.

2. In a device of the class described, the combination with a suitably-journaled, pivotally-swung frame, of two shafts, G, journaled in said frame, a yoke spanning the gap between the inner ends of said shafts, suitable means for adjusting space between the inner ends of said shafts and suitable means for holding an ordinary lawn-mower cutter in place between the inner ends of said shafts; substantially as described.

3. In a device of the class described, the combination with two shafts arranged in line and having a gap between them, of removable conically-socketed caps adapted to fit over the ends of said shafts and center a third shaft; substantially as described.

4. A tool guide and holder consisting of the plate, E, adapted to be clamped to the supporting-base of a grindstone, a tool-guide proper adapted to be adjustably clamped with reference to said grindstone, a frame pivotally connected to said plate, E, said frame consisting of a bar, F, upright journaled arms, F', thereon, two shafts, G, supported by said arms and having a gap between their inner ends, and a yoke, H, spanning said gap, and means for supporting a lawn-mower cutter between the inner ends of said shafts; substantially as described.

In witness whereof I have hereunto set my hand, at Freeport, in the county of Stephenson and State of Illinois, this 25th day of January, A. D. 1902.

SILAS C. SCHOFIELD.

Witnesses:
JAMES H. STEARNS,
OSCAR R. ZIPF.